(12) United States Patent
Grund-Pedersen (10) Patent No.: US 8,083,524 B2
(45) Date of Patent: Dec. 27, 2011

(54) INTERVENTIONAL SIMULATOR SYSTEM (75) Inventor: Jan Grund-Pedersen, Kullavik (SE)

(73) Assignee: Mentice AB, Gothenburg (SE)

( * ) Notice: Subject to any disclaimer, the term of this patent is extended or adjusted under 35 U.S.C. 154(b) by 757 days.

(21) Appl. No.: 10/538,007

(22) PCT Filed: Dec. 3, 2003

(86) PCT No.: PCT/SE03/01893
§ 371 (c)(1),
(2), (4) Date: Nov. 30, 2005

(87) PCT Pub. No.: WO2004/051604
PCT Pub. Date: Jun. 17, 2004

(65) Prior Publication Data
US 2006/0127867 A1 Jun. 15, 2006

Related U.S. Application Data (60) Provisional application No. 60/430,335, filed on Dec. 3, 2002.

(30) Foreign Application Priority Data

Dec. 3, 2002 (SE) ...................... 0203570

(51) Int. Cl.
G09B 23/28 (2006.01)
G06G 7/50 (2006.01)
(52) U.S. Cl. ............... 434/268; 434/262; 703/9; 703/13
(58) Field of Classification Search .................. 434/262, 434/268; 703/6, 9, 13
See application file for complete search history.

(56) References Cited

U.S. PATENT DOCUMENTS

| 3,426,448 A | | 2/1969 | Sarnoff | |
|---|---|---|---|---|
| 4,875,165 A | * | 10/1989 | Fencil et al. | 345/424 |
| 4,907,973 A | | 3/1990 | Hon | |
| 5,315,665 A | | 5/1994 | Ohhashi | |
| 5,380,307 A | | 1/1995 | Chee et al. | |
| 5,464,410 A | * | 11/1995 | Skeens et al. | 606/130 |

(Continued)

FOREIGN PATENT DOCUMENTS

EP 0 970 714 A2 1/2000

(Continued)

OTHER PUBLICATIONS

T. Yamaguchi, *Computational Biomechanics Simulation as a Means of Life Sciences*, Journal of the Japan Society for Simulation Technology, Dec. 1999, vol. 18, No. 4 (with English translation of Abstract).

(Continued)

*Primary Examiner* — Kang Hu
(74) *Attorney, Agent, or Firm* — Harness, Dickey & Pierce, P.L.C.

(57) ABSTRACT

The present invention relates to an interventional procedure simulation system and method, comprising a control unit and an interface unit, said control unit communicating with said interface unit to simulate handling of at least one instrument interfaced by said interface unit. The control unit comprises a database of vessels having hierarchy structure, each vessel having a diameter and a stiffness, and said instrument being a tool expendable in a simulated vessel. When the tool is expanded, a geometry of said vessel changes resulting in a fluid flow change.

13 Claims, 9 Drawing Sheets

| 100 | Apparatus |
|---|---|
| 111 | Display Unit |
| 112 | Input Device |
| 120 | Interface Device |
| 121-123 | Instruments |
| 130 | Scans |

U.S. PATENT DOCUMENTS

| | | | |
|---|---|---|---|
| 5,805,140 | A | 9/1998 | Rosenberg et al. |
| 5,828,197 | A | 10/1998 | Martin et al. |
| 5,882,206 | A | 3/1999 | Gillio |
| 5,987,960 | A | 11/1999 | Messner et al. |
| 6,038,488 | A * | 3/2000 | Barnes et al. ............... 700/161 |
| 6,106,301 | A | 8/2000 | Merril |
| 6,191,796 | B1 | 2/2001 | Tarr |
| 6,267,599 | B1 | 7/2001 | Bailey |
| 6,443,735 | B1 | 9/2002 | Eggert et al. |
| 6,470,302 | B1 | 10/2002 | Cunningham et al. |
| 6,538,634 | B1 | 3/2003 | Chui et al. |
| 6,773,263 | B2 | 8/2004 | Nicholls et al. |
| 6,775,399 | B1 | 8/2004 | Jiang |
| 6,785,572 | B2 | 8/2004 | Yanof et al. |
| 6,842,638 | B1 | 1/2005 | Suri et al. |
| 6,857,878 | B1 | 2/2005 | Chosack et al. |
| 6,929,481 | B1 | 8/2005 | Alexander et al. |
| 6,939,138 | B2 | 9/2005 | Chosack et al. |
| 7,056,123 | B2 | 6/2006 | Gregorio et al. |
| 7,156,664 | B2 | 1/2007 | Wallaker |
| 7,191,110 | B1 * | 3/2007 | Charbel et al. ............... 703/11 |
| 7,371,067 | B2 * | 5/2008 | Anderson et al. ............ 434/262 |
| 2001/0016804 | A1 | 8/2001 | Cunningham et al. |
| 2001/0055748 | A1 | 12/2001 | Bailey |
| 2002/0137014 | A1 | 9/2002 | Anderson et al. |
| 2002/0168618 | A1 | 11/2002 | Anderson et al. |
| 2003/0069719 | A1 | 4/2003 | Cunningham et al. |
| 2004/0015070 | A1 | 1/2004 | Liang et al. |
| 2004/0234933 | A1 | 11/2004 | Dawson et al. |
| 2006/0127864 | A1 | 6/2006 | Ohlsson |
| 2006/0234195 | A1 | 10/2006 | Grund-Pederson |

FOREIGN PATENT DOCUMENTS

| | | |
|---|---|---|
| JP | 8030185 A | 2/1996 |
| JP | 10-094519 | 4/1998 |
| JP | 2000-342692 | 12/2000 |
| JP | 2001-046496 | 2/2001 |
| WO | WO 99/39317 | 8/1999 |
| WO | WO 01/56491 | 8/2001 |
| WO | WO 01/78039 | 10/2001 |
| WO | WO 01/88882 A2 | 11/2001 |
| WO | WO 02/059859 | 8/2002 |
| WO | WO 02/070980 | 9/2002 |

OTHER PUBLICATIONS

S. Guo, *A Study of Active Catheter System*, Journal of Jap. Robotics Society; Sep. 1996, vol. 14, No. 6 (with English translation of Abstract).

Japanese Office Action dated Feb. 10, 2009 in corresponding Japanese Application 2004-557051 (with English translation).

International Search Report for PCT/SE 2003/001890 dated Feb. 18, 2004.

International Search Report for PCT/SE 2003/001891 dated Apr. 15, 2004.

International Search Report for PCT/SE 2003/001892 dated Feb. 18, 2004.

Office Action dated May 26, 2010 in co-pending U.S. Appl. No. 10/538,011.

Office Action dated Jul. 14, 2010 in co-pending U.S. Appl. No. 10/538,005.

Office Action dated Jan. 19, 2011 for co-pending U.S. Appl. No. 10/538,011.

Tao Bo Computer Science and Technology, China Academic Journal Electronic Publishing House "Compression of Microvascular Network Image Based on Description," (Feb. 15, 1996) and English translation thereof.

* cited by examiner

INTERVENTIONAL SIMULATOR SYSTEM

PRIORITY STATEMENT

This application is a National Phase entry of PCT Application No. PCT/SE2003/001893, filed on Dec. 3, 2003, which claims priority to Sweden Application No. 0203570-7, filed on Dec. 3, 2002 and U.S. Provisional Application No. 60/430,335, filed on Dec. 3, 2002.

TECHNICAL FIELD OF THE INVENTION

The present invention relates to a computerized apparatus for simulating an interventional operation, and in particular the effect of using special instruments.

BACKGROUND OF THE INVENTION

Principles of adult education, tenets of experiential learning, and theories addressing the development of expertise have all underscored the critical role experience plays in the learning process. State-of-the-art simulations can be successfully included in contemporary surgical and medical education to offer trainees and practicing physicians the requisite learning experiences based on these educational underpinnings. All learners can be offered opportunities to acquire the essential skills and to achieve specified competency levels based on standardized learning experiences. Simulations can be used to facilitate learning through the evaluation of performance and provision of immediate, individualized, and detailed feedback. Simulations offer controlled settings that allow repetition until the defined performance levels are achieved, decrease stress levels of learners, increase the confidence levels of learners, and increase safety in real settings by assuring the achievement of technical competence prior to work on patients. Practicing physicians can improve their skills and can learn new procedures emerging as a result of advances in science and technology through educational interventions involving the use of simulations. In addition, the use of simulations can help address practical issues, such as the demands on faculty time, by providing trainees the opportunities for independent learning and practice. The current emphasis on accountability and on assurance of the quality of health care may also be addressed through the use of such simulations and data on outcomes can be used to assure the public of the competence of physicians.

Simulations should be considered an essential part of every contemporary educational program that addresses technical skills development. They can be used to ensure effective teaching and learning, to provide valid and reliable means of assessment of the skills of learners, to yield information on specific weaknesses that require improvement, and to create individual proinstruction sets of the technical ability of learners. In order to achieve the desired results, specific curricula should be developed based on principles of adult education, experiential learning, and effective feedback. Such simulations may also be used in programs of continuing professional education and certification. The initial investment of resources needed for the development and acquisition of simulations and for the creation of training programs that incorporate them effectively in educational models is readily offset by the numerous advantages resulting from expeditious performance of procedures in the operating room, enhancement of patient safety, and decrease in the faculty time needed to teach learners various technical skills. Such simulations may also be used to assess the effectiveness of educational efforts and even to select individuals for training. Thus, the simulations have the potential to make a major impact on programs of surgical and medical education of the future.

As a result of the rapid developments within the computer technique, simulations, especially for the purpose of surgical and medical education, have improved considerably. However, the presently known apparatus and methods do not allow a full range simulation of different instruments used.

Prior art does not suggest or give a hint for simulating different instruments according to the present invention.

U.S. Pat. No. 4,907,973 discloses a medical investigative system in which a person interacts with the system to interject information that is utilized by the system to establish non-restricted environmental modelling of the realities of surrogate conditions to be encountered with invasive or semi-invasive procedures. This is accomplished by video display of simulated internal conditions that appear life-like, as well as by display of monitor data including, for example, blood pressure, respiration, heart beat rate and the like. The document mentions blood flow but not blood flow changes and how such a simulation is accomplished.

WO 01/88882 relates to a method and a system for simulating the minimally invasive medical procedure of bilio-pancreatic duodenoscopy. The system is designed to simulate the actual medical procedure of bilio-pancreatic duodenoscopy as closely as possible by providing both a simulated medical instrument, and tactile and visual feedback as the simulated procedure is performed on the simulated patient. Particularly preferred features include a multi-path solution for virtual navigation in a complex anatomy. In addition, the system and method optionally and more preferably incorporate the effect of dynamic contrast injection of dye into the papilla for fluoroscopy. The injection of such dye, and the subsequent visualization of the bilio-pancreatic organ system in the presence of the duodenoscope, must be accurately simulated in terms of accurate visual feedback. In addition, the bilio-pancreatic organ system is optionally and more preferably modeled as a plurality of splines, most preferably arranged as a tree of splines or other branched structure. Thus, the system and method provide a complete solution to the complex and difficult problem of training students in bilio-pancreatic duodenoscopy procedures. The document mentions that in step 3, the digitized images are preferably selected for clarity and lack of visual artefacts, and are then stored in a texture-mapping database. More preferably, the digitized images are enhanced before being stored. Most preferably, the texture mapping also include animation. Such animation could simulate effects such as the flow of biological fluids such as blood, flowing downward due to the influence of gravity. Neither this document mentions the flow change or how it is accomplished.

SUMMARY OF THE INVENTION

The main object of the preferred embodiment of the invention is to present a novel and effective system for a real-time simulation of affect of expanding instruments in simulated vessels, preferably in cardiovascular or endovascular diagnostic or interventional procedures. Another object of the invention is to simulate the flow change of for example blood or other fluid in a simulated vessel.

Thus, an interventional procedure simulation system according to the present invention comprises a control unit and an interface unit, the control unit communicating with the interface unit to simulate handling of at least one instrument interfaced by the interface unit. The instrument is a tool expandable in a simulated vessel, whereby when the tool is expanded, geometry of the vessel changes resulting in a blood flow change. The simulated vessels are interconnected in a hierarchical structure and the blood flow change effects blood flow changes in adjacent simulated vessels.

BRIEF DESCRIPTION OF THE DRAWINGS

In the following, the invention will be further described in a non-limiting way with reference to the accompanying drawings in which.

DETAILED DESCRIPTION OF THE EMBODIMENTS

Figure 1:
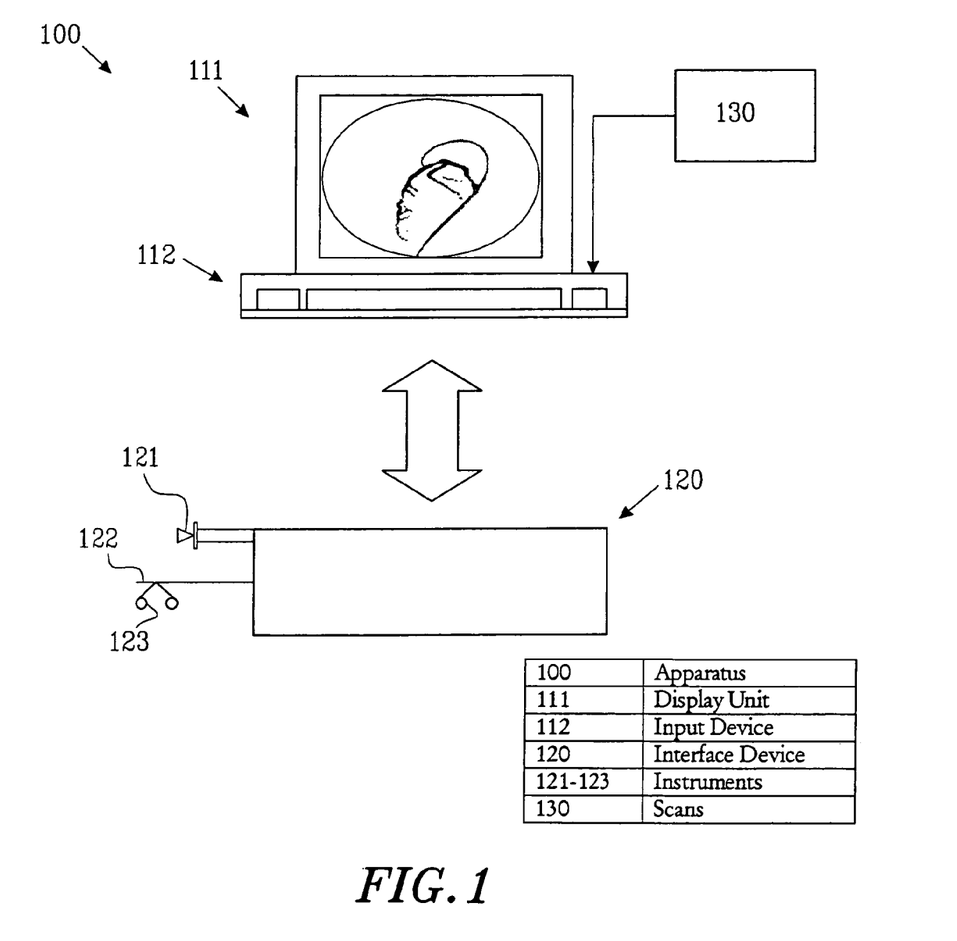
FIG. 1 schematically illustrates a block diagram according to one embodiment of the invention.

One exemplary embodiment of a simulation apparatus according to the invention is schematically illustrated in FIG. 1. The apparatus 100 comprises a computer unit 110 and an interface device 120. The computer unit 110 can be a conventional PC or similar, or a unit integrated with the interface device 120. The computer unit according to this embodiment communicates with a display unit 111, an input device 112 such as a keyboard and a mouse, and a communication interface (not shown).

The interface device 120, described in a parallel application, entitled "AN INTERVENTIONAL SIMULATION DEVICE" (SE 0203568-1) by the same applicant and incorporation herein through reference, is arranged to receive a number of instruments 121-123. The control system, described in a parallel application, entitled "AN INTERVENTIONAL SIMULATION CONTROL SYSTEM" (SE 0203567-3) by the same applicant and incorporation herein through reference, is arranged to simulate interventional procedures.

However, the invention is not limited to a system comprising the above mentioned control system and interface devices. The teachings of the invention can be employed in any system able of simulation of self-expanding instruments.

A 3D geometry can be constructed in different ways:

They can be modeled in a 3D modeling software, i.e. from scratch using anatomy books, video clips, etc as references only.

They can be reconstructed from real patient data, e.g. obtained through scans 130 with CT, MRI, Ultrasound, fluoroscope, etc.

Figure 2:
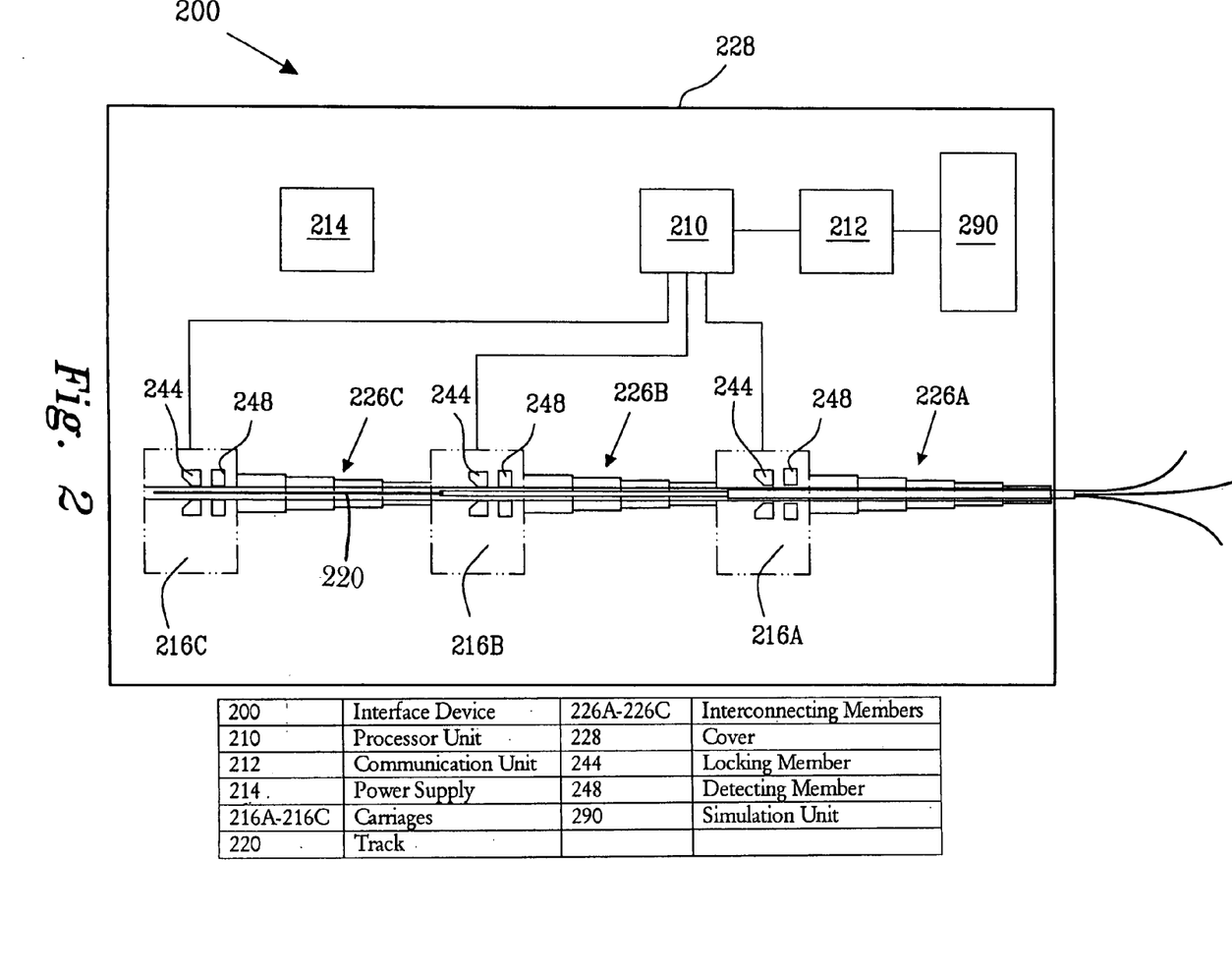
FIG. 2 is a schematic view of an interface device.

An interface device 200, schematically illustrated in FIG. 2, as a preferred embodiment, is arranged to receive a number of instruments, dummies or real, preferably at least two instruments. The device comprises a number of moveable carriages 216A-216C corresponding to the number of the instruments, a common track 220, and an interconnecting member 226 provided as a telescopic tube. The interconnecting member 226 interconnects the carriages 216A-216C serially. Each carriage is provided with an opening for enabling reception of the instruments. Each carriage 216A-216C further comprises members to receive and lock at least one of the instruments, and members for receiving a movement from the instrument and generating a force, which is fed back to the instrument with respect to a simulation characteristic. Preferably, each carriage comprises a detecting arrangement for detecting the type of the instrument inserted through the interconnecting member. The interface device is connected to the control unit (PC) to measure the movement of each carriage and regulate the movement by means of a speed regulator and a distance regulator. Each carriage is connected with a gear belt transmission for driving along the track 220. Each carriage is provided with a crank block, which is arranged on a torque wheel. The crank block is provided with a mating surface, which is pressed towards a collet that grips the instrument wire. Moreover, each carriage is arranged with an outlet, which is provided with a detecting member, which detects presence of an instrument in the carriage. The detecting member is arranged to detect the thickness of each instrument. The optical sensor detects presence of an instrument in the carriage. The control unit measures a longitudinal movement and a movement of rotation, of the instrument and gives force-feedback in the longitudinal direction and in the direction of rotation, of the instrument according to received force and torque. A locking member is arranged to clamp an instrument, which instrument is attached to a central wall. The locking member comprises a torque wheel, which is arranged in the central wall. The crank block is provided inside the torque wheel, which crank block moves in longitudinal direction. The crank block is fixed in the direction of rotation.

Preferably, the system simulates the way different types of self-expanding tools behave. The self-expanding tool consists of the tool itself and a covering sheath (tube). As the sheath is retracted, the tool itself expands to its "natural" shape. In some cases, it is also possible to push a sheath back to cover the tool again.

Example 1

Self-Expandable Stent. The stent is pressed on top of a hollow tube, which runs on top of a wire, and covered, by a sheath. The stent is not attached to the underlying tube. When the covering sheath is retracted, the stent opens gradually and takes a predefined diameter (in a vessel this diameter is the maximum, and will be less if the vessel walls press the stent together). When the sheath is fully retracted, the stent will be totally detached from the sheath and underlying tube, and pressed against the vessel walls. There is now no way of retrieving the stent itself.

Example 2

Figure 3:
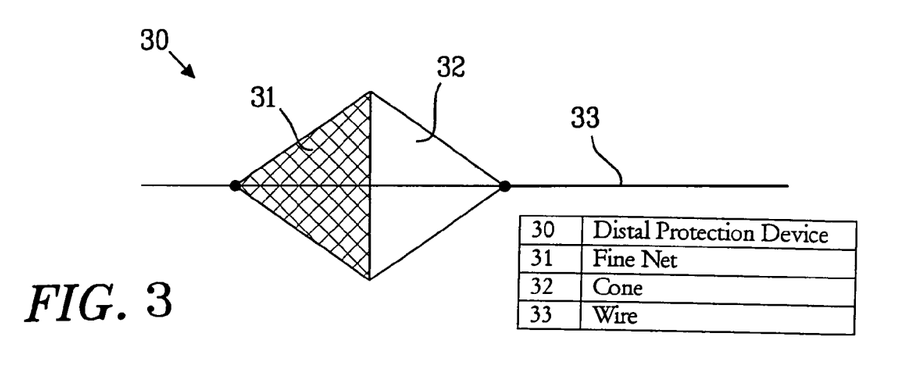
FIG. 3 is a schematic view of a simulated instrument.

Distal Protection Device (DPD). A DPD 30 as illustrated in FIG. 3, is a "double cone" 31 and 32 attached at two ends to a wire 33, and covered by a sheath (not shown). The distal part of the "cone" is a fine net 31, which is attended to catch particles that can be set free during an intervention. The proximal part of the "cone" is totally open. When the sheath is retracted, the cone takes its "natural" shape—widest at the middle. Since it is attached to the underlying wire, the sheath can be pushed back to again cover the "cone".

Figure 4:
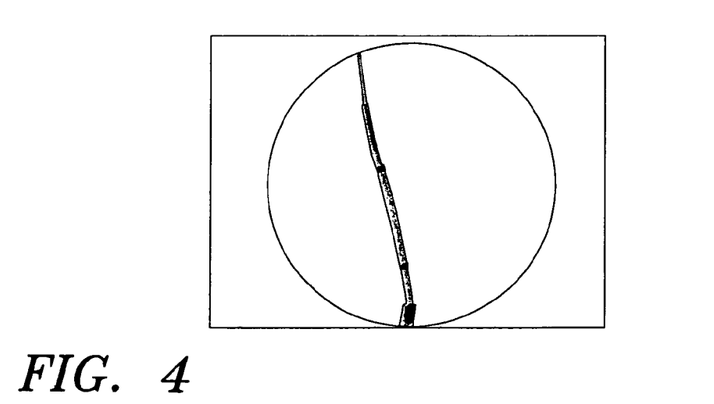
FIGS. 4-6 are fluoroscopic images illustrating sequences using a balloon and stent.
Figure 5:
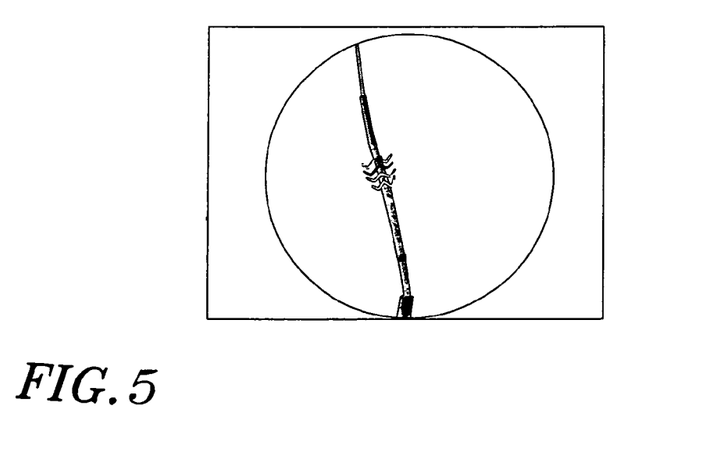
Figure 6:
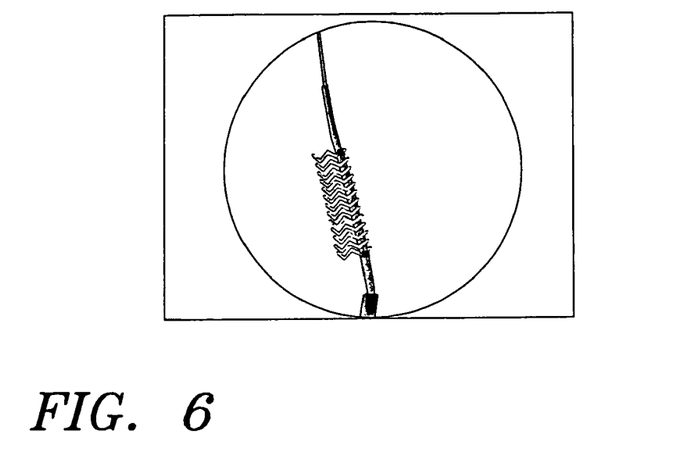
Figure 7:
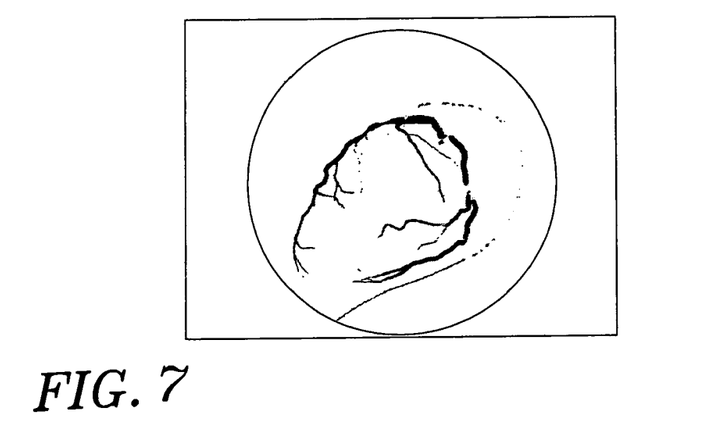
FIGS. 7-10 are fluoroscopic images illustrating sequences using a guide catheter.

In the following, the invention will be described in conjunction with a number of non-limiting examples:

FIGS. 4-6 illustrate sequences of a self-expanding instrument, in this example a self-expanding stent. In case of self-expandable stents, they are covered with a sheath, which is then retracted and the stent expands to a given size (but as it hits the vessel wall the final size will be dependent of the vessel "stiffness" and the properties of the stent itself). The properties of the stent, both visually, the way it expands and the effects it has on the vessel are simulated. The vessel can also be post dilated with a "regular" balloon afterwards. In FIG. 4 a self-expandable stent is in place in a vessel but not deployed, in FIG. 5 the sheath covering the stent is partially retracted and in FIG. 6 the sheath is fully retracted and stent deployed (not connected to the tool). The simulator program has a number of initial values: a rest expansion diameter for the self expanding instrument expansion-diameter, the vessel initial inner diameter (at the simulated part), spring constant for the self expansion instrument and a vessel stiffness. These parameters determine how the simulator sets the boundaries for the expansion of the instrument and (simulated part) of the vessel. If a sheath is used, also its diameter must be initiated.

A balloon and a stent can also be used in same way; the balloon (also for the stent) interacts with a vessel, which expands. The blood flow changes, and so does the contrast if injected. The stent is simulated in such a way that it is visible and stays in place as the balloon is deflated. It is also possible to enter with a larger balloon and inflate it again. This will influence both the stent and the vessel, so-called post dilatation. It is also possible to first inflate a balloon, before using a stent, so-called pre dilatation. Simulation is achieved by using force feedback, whereby a tight lesion is felt, when going through with a "large" balloon.

Figure 14:
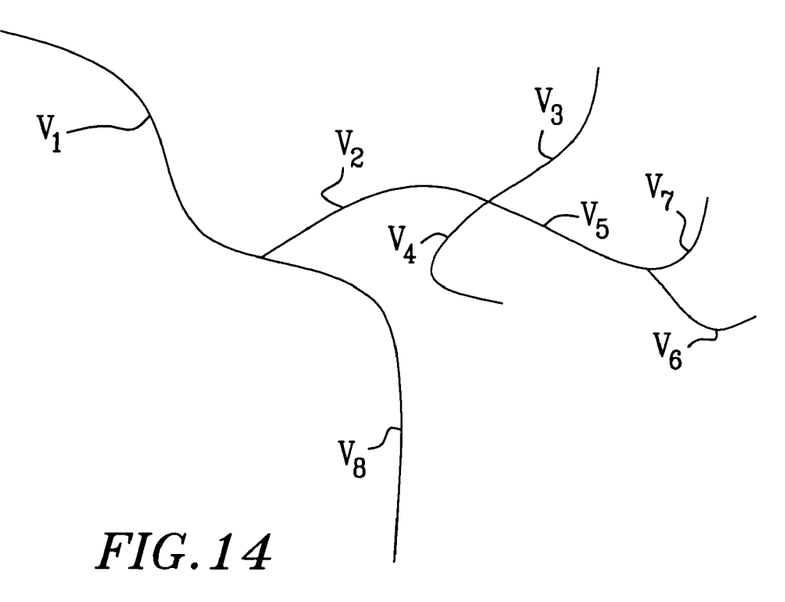
FIG. 14 illustrates a schematic vessel structure.
Figure 15:
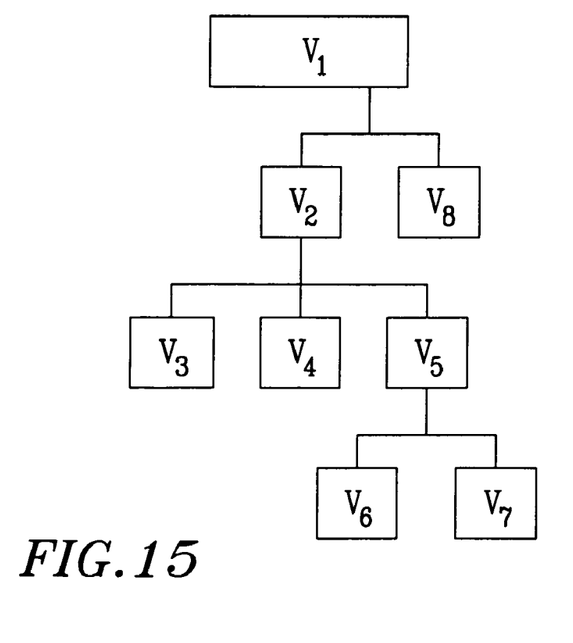
FIG. 15 is a structured vessel hierarchy according to FIG. 14.

According to the most preferred embodiment of the invention, the vessels are arranged in a hierarchy. All vessels are provided in a database having a structured hierarchy as illustrated in FIGS. 14 and 15, which tells how vessels connect. The change of the blood flow in one vessel affects the flow in other vessels in the hierarchy.

The system simulates the balloon instrument and the effects it has on the surrounding tubular organ, e.g. a vessel or a duct.

A vessel consists of a tubular geometry and has its specific stiffness. This stiffness can be different for different vessels and different parts of a vessel. Specifically the parts called lesions (narrowing of a vessel) may have different stiffness than the neighboring vessel parts.

The geometry of a vessel affects the flow of the fluids (blood) inside. A lesion will decrease the flow through the rest of the vessel tree beyond that point.

A balloon, for example, is used to open up lesions, thus expanding a narrow section of a vessel and increasing the flow. The balloon is inflated under high pressure. Each specific balloon has its predefined size (diameter and length). The resulting diameter will however depend on the amount of pressure applied externally by the physician inflating the balloon and the internal pressure from the vessel walls.

The system calculates the flow through the vessel-tree as a result of its geometry. Narrow sections will result in lower flow. Every time the geometry of the vessel tree is changed or objects block (even partially), the flow is recalculated. For instance, insertion of an instrument in one of the simulated vessel affects the recursive calculation of the simulated fluid flow through the simulated vessels.

The flow calculations can be made in the same way as an electrical resistive network is solved. Potentials correspond to pressure, currents correspond to flow and electrical resistance corresponds to fluid resistance. The top of the fluid network is in the left ventricle of the heart, where the highest pressure is, and the bottom of the network is in the veins connecting to the right atrium of the heart, where the potential is close to zero. The intermediate vessels, i.e. all vessel branches in the tree, have a calculated flow resistance depending on their diameter and their length. The algorithm for flow calculation calculates recursively through the tree until flow and pressure in all branches are solved.

The system calculates the effects a balloon has on the surrounding vessel walls. Depending on the size (diameter and length) of the balloon, and the pressure applied the vessel wall will be affected differently. The same balloon, using the same pressure, will also affect the same size of vessel differently if the vessel has different stiffness. The same balloon with different pressure will affect the same vessel differently.

Following is an exemplary method of simulating the flow change. Data on vessel and balloon characteristics are stored in a storage unit in the computer. The pressure data are fetched from the interface device.

The algorithm for the vessel diameter change works in the following manner (simplified): The balloon is inflated with a pressurizer, a pump. The balloon diameter is a function of the pump pressure when the balloon diameter is less than the vessel diameter and the vessel is unaffected (but the flow is updated according to below method, since the cross section area changes). When the balloon diameter is equal to or larger than the vessel diameter, the vessel diameter starts to increase. The balloon pressure applies on the vessel wall and causes internal strain in the vessel. This in turn makes the vessel wall expand depending on its stiffness, resulting in the vessel radius increase, which gives a new vessel wall area, causing new internal forces in the vessel wall, and so on.

Figure 16:
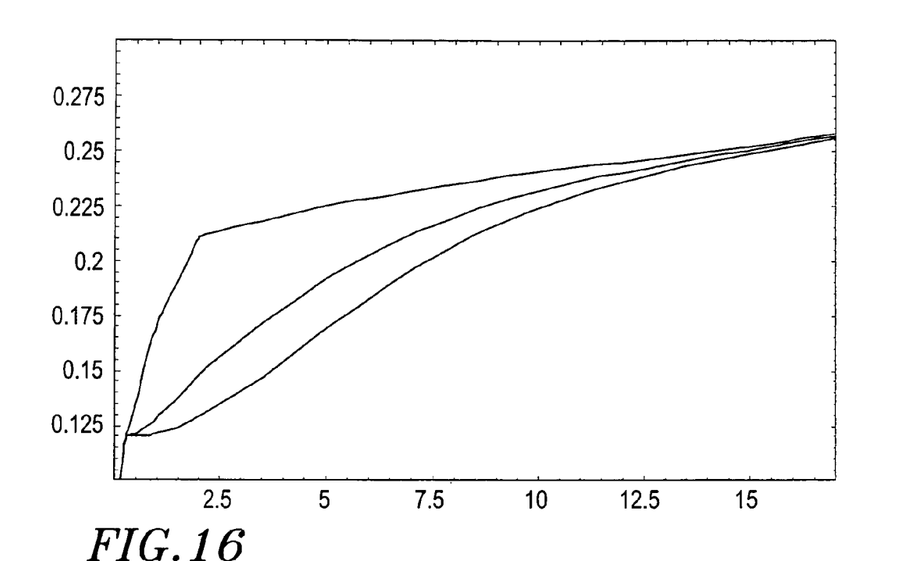
FIG. 16 is a model for radius calculation, in which R(p) is shown for (from top to bottom): q=0, q=1, q=2 ($p_0$=4)
Figure 17:
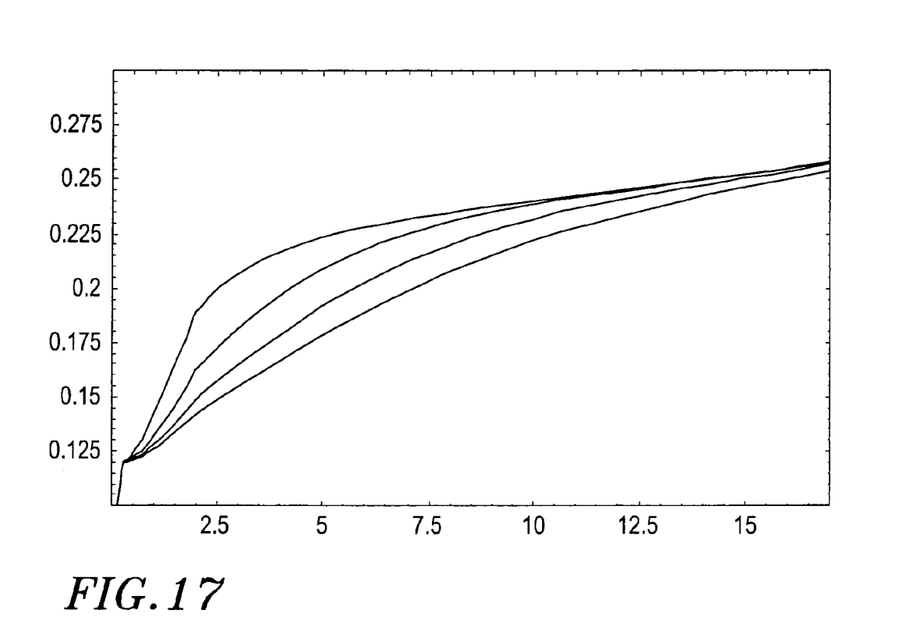
FIG. 17 is another model for radius calculation, in which R(p) is shown for $p_0$=2, 4, 6, 8 (from left to right) (q=1)
Figure 18:
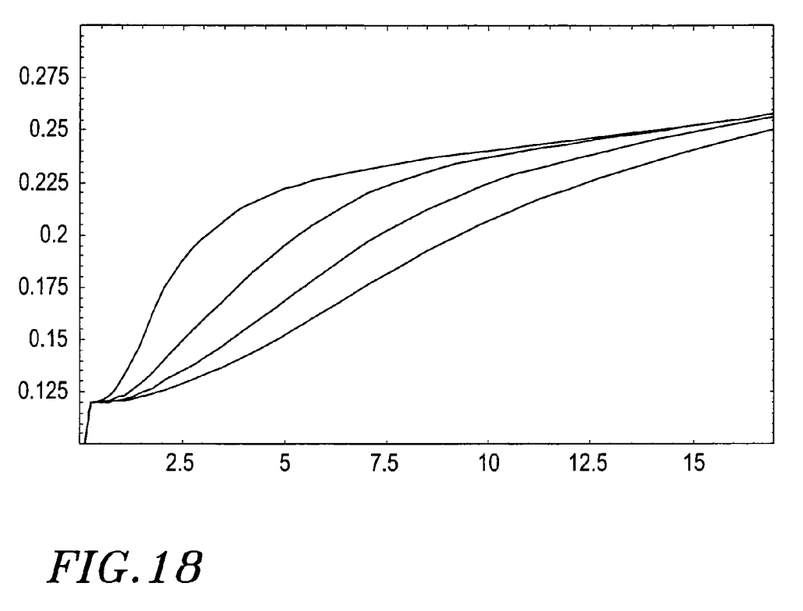
FIG. 18 is another model for radius calculation, in which R(p) is shown for $p_0$=2, 4, 6, 8 (from left to right) (q=2).

An exemplary model used in the computer unit has the form:

$$R(p) = \begin{cases} r_N(p) & \text{if } r_N(p) < r_v \\ r_v + (r_N(p) - r_v)\frac{k_B}{k_B + k_V}\tanh^q\left[\frac{p}{p_0}\right] & \text{else} \end{cases}$$

where p is the pressure in the balloon, R(p) is the actual radius of the balloon in the vessel, $r_x(p)$ is the size of the balloon in free space at a given pressure, and $r_v$ is the initial radius of the vessel q is an integer determining the shape of the function (see FIG. 16) and $p_0$ is the threshold value of the pressure (see FIGS. 17 and 18). Finally, $k_B$ and $k_v$ determine the stiffness of the balloon and the vessel, respectively. R(p) is also heavily filtered to obtain a slow expansion. Note that the balloon grows freely until it has the size of the vessel.

It is possible to fix the value of q once and then having a default value of $p_0$ for special cases only.

Figure 8:
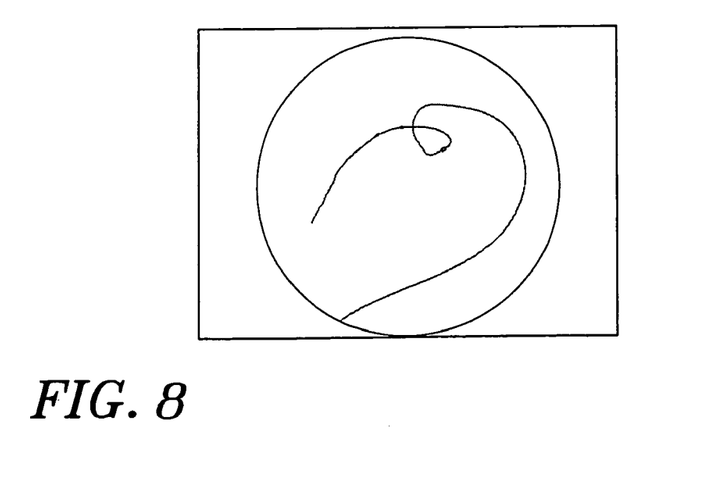
Figure 9:
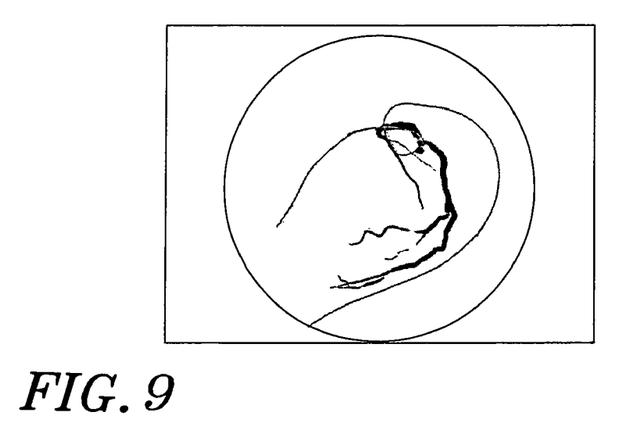
Figure 10:
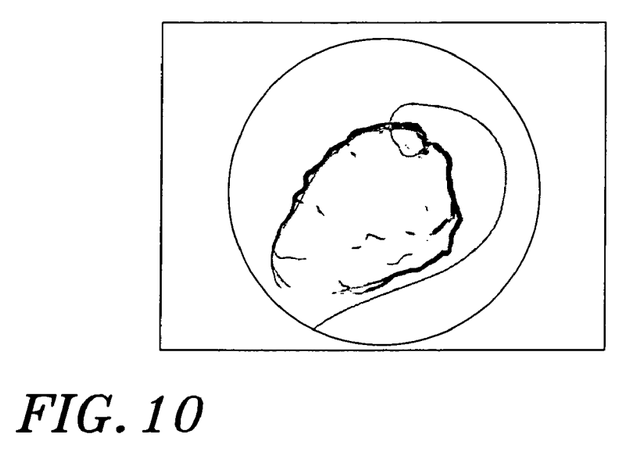

During the balloon inflation, the flow will be affected by the balloon blockage (see FIG. 8, total blockage).

When the balloon is deflated a permanent change of the vessel geometry will occur, thus resulting in a change of flow.

instead of a balloon a self-expanding stent can also be used to open the vessel geometry, and alter the flow.

The procedure illustrated in FIGS. 7-10, is done in such a way that first a guide catheter and guide wire are advanced to access either the right or left coronary vessel tree. Contrast is then injected through the catheter to locate the lesion/stenosis. The view can be changed to obtain a perfect visualization of the lesion. Images can also be exported or used by a separate QCA (Qualitative C Assessment) program, for length and width measurement. Then the user can decide what sizes of balloon/stent he/she wants to use. (Typically, some cine loops are recorded before and after balloon dilatation/stenting.) A thin guide wire (coronary wire) is first advanced through the catheter and into the vessel tree. The tip of the wire can be shaped in an angle (user selectable), and the wire is then steered through the vessel tree by rotating the wire, and pulling/pushing to find the right way past the lesion. The balloon/stent is then advanced on top of the wire, and positioned in the right place using the radioopaque markers. Contrast can be injected to see that it is positioned in the right place. Finally, the balloon/stent is inflated, held for some time, and then deflated. All the steps are simulated and can be performed as in real life.

Figure 11:
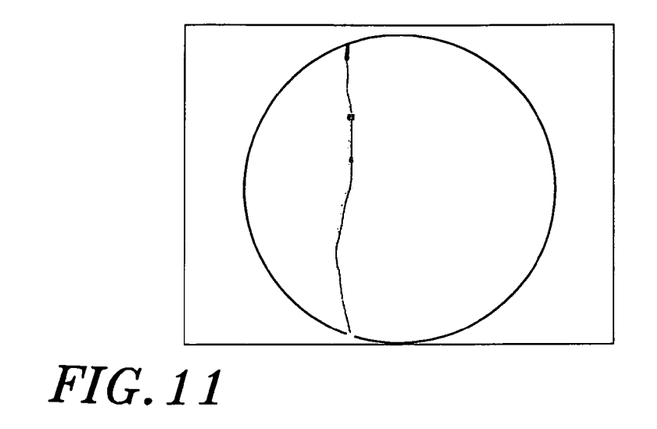
FIGS. 11-13 are fluoroscopic images illustrating sequences using a distal protection.
Figure 12:
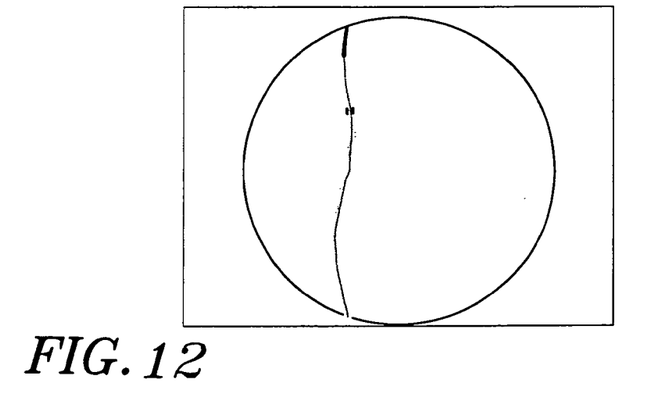
Figure 13:
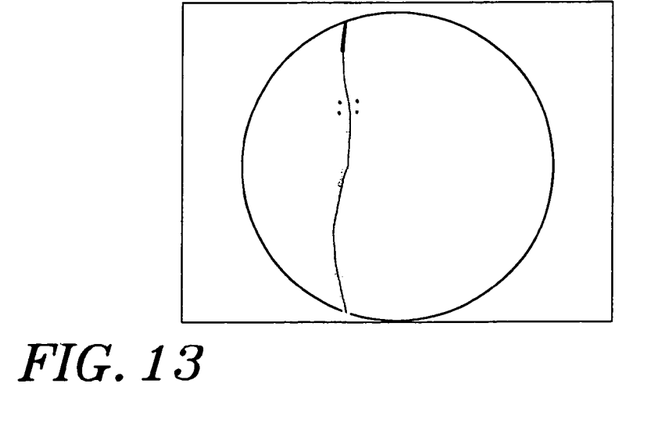

A distal protection device stops emboli from moving further and block very small vessels (which can be devastating in the brain). A filter "basket" can then be used attached to a wire and at first covered with a sheath. The wire and sheath is positioned past the lesion, and then the sheath is retracted, leaving the basket as a protection for when the lesion is dilated. Afterwards a recovery sheath is advanced to close the basket and the two are together retracted. The behavior of the distal protection device is simulated, comprising how one handles it and the visible characteristics. Other types of protection devices are also possible to simulate, for example balloons that block the flow while dilating. Sequences are illustrated in FIGS. 11-13, showing:

FIG. 11A distal protection device is in place in a vessel, sheath-covering filter partially retracted;

FIG. 12 the sheath is retracted, markers at the "base" of filter starting to "expand";

FIG. 13 the sheath retracted even more.

Note that the filter itself, in this case, is not visible on a fluoroscopic image. Only the marker points are. The sequence above can be reversed, since the filter stays connected to the wire.

The invention is not limited to the shown embodiments but can be varied in a number of ways without departing from the scope of the appended claims and the arrangement and the method can be implemented in various ways depending on application, functional units, needs and requirements etc.

The invention claimed is:

1. A simulation system for training and assessing the performance of an endovascular procedure, the system comprising:
   a control unit and an interface unit, said control unit being configured to communicate with said interface unit to simulate simultaneous handling of at least two different instruments interfaced by said interface unit, wherein interface unit is configured to receive the at least two different instruments along two different axes arranged in a parallel manner,
   wherein the control unit includes a database of vessels interconnected in a hierarchical structure, each vessel having a diameter and a stiffness,
   said instruments being tools expandable in simulated vessels, whereby when said tools are expanded, a simulated geometry of said vessels changes resulting in a simulated fluid flow change in the simulated vessels,
   said simulated fluid flow change affecting fluid flow changes in adjacent simulated vessels,
   the system being configured to recursively calculate said simulated fluid flow in the simulated vessels and the fluid flow changes in said adjacent simulated vessels, the recursive calculation being a function of at least one parameter, wherein at least one parameter is a result of a real time simulation of a heart function, and
   the system being further configured to provide the simulated fluid flow change in real time, and
   insertion of said instruments in the simulated vessels affects the recursive calculation of said simulated fluid flow through the simulated vessels.

2. The system of claim 1, wherein said instruments are one selected from the group consisting of a balloon, stent and a distal protection tool.

3. The system of claim 1, wherein each of the plurality of vessels is realized by a tubular geometry and a specific stiffness.

4. The system of claim 1, wherein the plurality of vessels are realized by lesions having different stiffness than neighboring vessel parts.

5. The system of claim 1, wherein the system is configured to calculate a flow through the hierarchal structure realized as a vessel-tree as a result of a geometry of the vessel-tree.

6. A method of simulating flow of a body fluid in a simulation system for training and assessing the performance of an endovascular procedure where the simulation system includes a control unit and an interface unit, the method comprising the steps of:
   providing a database of vessels having a hierarchical structure in said control unit, wherein
   each vessel has a diameter and a stiffness,
   said control unit being configured to communicate with said interface unit to simulate simultaneous handling of at least two different instruments interfaced by said interface unit, and
   the interface unit is configured to receive the at least two different instruments along two different axes arranged in a parallel manner;
   providing said instruments as tools expandable in simulated vessels;
   changing a simulated geometry of said simulated vessels resulting in a simulated fluid flow change when said tools is expanded; and
   recursively calculating the simulated fluid flow of said simulated vessels having the hierarchical structure until flow and pressure in all branches of said hierarchical structure are solved, the recursive calculation being a function of at least one parameter,
   wherein the at least one parameter is a result of a real time simulation of a heart function,
   the simulated fluid flow change is provided by the simulation system in real time, and
   insertion of said instruments in the simulated vessels affects the recursive calculation of said simulated fluid flow through the simulated vessels.

7. The method of claim 6, wherein the flow simulation is modeled as an electrical resistive network.

8. The method of claim 7, wherein potentials correspond to pressure, currents correspond to flow and electrical resistance corresponds to fluid resistance.

9. The method of claim 8, wherein a top of the fluid network is realized in a left ventricle of a heart, and a bottom of the network is in veins connecting to a right atrium of the heart.

10. The system of claim 1, wherein said at least two instruments are real instruments.

11. The method of claim 6, wherein said at least two instruments are real instruments.

12. A simulation system for training and assessing the performance of an endovascular procedure, the system comprising:
   a control unit and an interface unit, said control unit being configured to communicate with said interface unit to simulate simultaneous handling of at least two different instruments interfaced by said interface unit, wherein interface unit is configured to receive the at least two different instruments along two different axes arranged in a parallel manner, wherein the control unit includes a database of simulated vessels arranged in a hierarchical structure, said at least two instruments are tools expandable in the simulated vessels, whereby when one of said tools is expanded, a simulated geometry of said simulated vessels changes resulting in a simulated fluid flow change in the simulated vessels, the system is configured to recursively calculate said simulated fluid flow in the simulated vessels and fluid flow changes in adjacent simulated vessels, the recursive calculation being a function of at least one parameter, wherein at least one parameter is a result of a real time simulation of a heart function, the system is further configured to provide the simulated fluid flow change in real time, and insertion of said at least two instruments in the simulated vessels affects the recursive calculation of said simulated fluid flow through the simulated vessels.

13. The system of claim 12, wherein said at least two instruments are real instruments.

* * * * *